April 21, 1953      W. C. SCHWALGE      2,635,759
OIL RECLAIMER FOR INTERNAL-COMBUSTION ENGINES
Filed Jan. 26, 1950
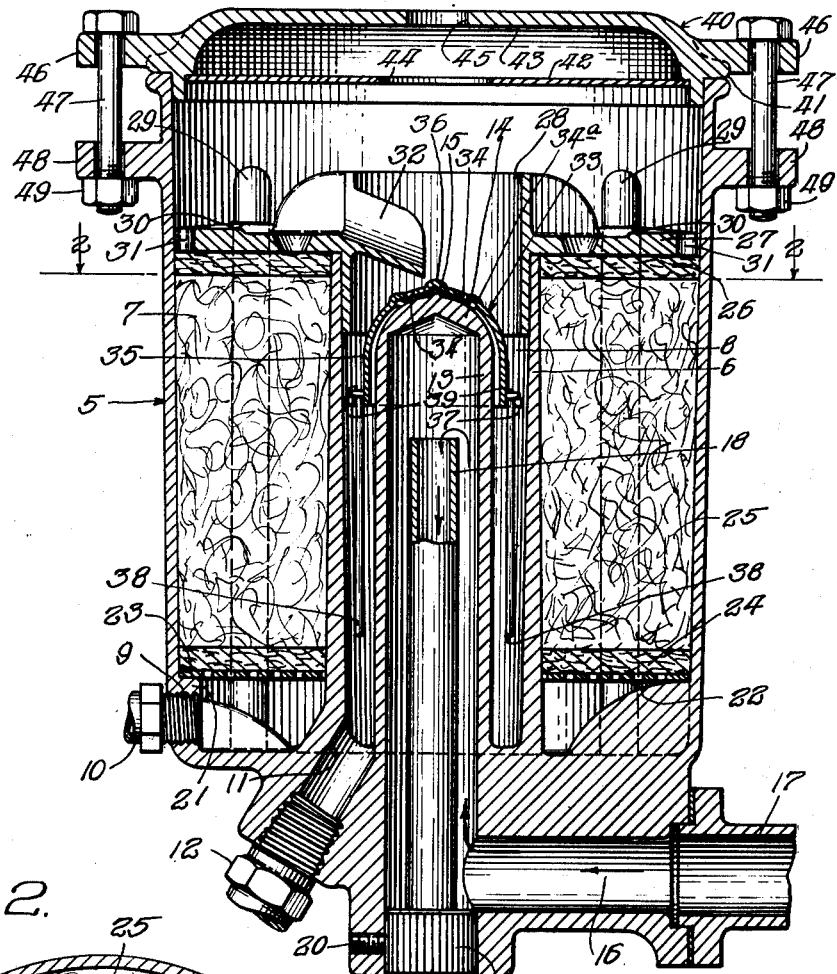
Inventor:
William C. Schwalge,
By Schroeder, Merriam,
Hogan & Brady, Attys.

Patented Apr. 21, 1953

2,635,759

UNITED STATES PATENT OFFICE 2,635,759

OIL RECLAIMER FOR INTERNAL-COMBUSTION ENGINES

William C. Schwalge, Chicago, Ill.

Application January 26, 1950, Serial No. 140,600

8 Claims. (Cl. 210—122.5)

This invention relates to an improvement in lubricating oil reclaiming apparatus for use with internal combustion engines or the like, and in particular it relates to an improvement in reclaimers of the type shown in my United States Letters Patent 2,068,473.

Such oil reclaimers combine filtering of oil with vaporization of water and light hydrocarbon contaminants therefrom so that the oil passing out of the filter and returning to the crankcase is substantially entirely free from diluents and contaminating water, as well as from gummy material which is retained by the filter.

In the oil reclaiming apparatus shown in my Patent 2,068,473, and as shown in the drawing hereof, a body member is divided into two upright chambers, one of which is filled with filtering material and the other of which is provided with an upright heating unit having suitable connections to the exhaust manifold of an internal combustion engine. Oil is introduced to the body member at the bottom of the filter chamber and passes upwardly through the filtering material to a spout by means of which it enters the chamber and is poured upon the top of the upright heating unit so that the heated walls of said unit may vaporize light fractions and water from the oil. The oil pours downwardly over the heating unit and passes to the crankcase through a suitable oil outlet.

I have found that vaporization of contaminants from the oil may not be uniform if the vehicle upon which the oil reclaimer is mounted is tilted slightly, as is usually the situation in operating a motor vehicle or boat. Under those conditions the oil is unevenly distributed over the surface of the heating unit and the heavy stream of oil passing down the low side of the unit may not be adequately heated.

The present invention tends to obviate this difficulty by providing a perforated oil distributing cap which is supported for universal movement above the heating unit and which has its side walls surrounding the upper end of the heating unit and in spaced relation therewith. The oil distributing cap has a number of evenly spaced depending oil carrying rods at its lower margin. Oil from the spout pours onto the oil distributing cap, which tends to remain upright when the vehicle is not level and thus equalizes the flow of oil over the surface of the heating unit.

The invention is illustrated in a preferred embodiment in the accompanying drawings in which Fig. 1 is a central vertical section through an oil reclaiming apparatus embodying the invention; and Fig. 2 is a section taken as indicated along the line 2—2 of Fig. 1.

Referring to the drawings in greater detail, a cylindrical body member, indicated generally at 5 is provided with an upright concentric cylindrical wall 6 which divides it into an outer filter chamber 7 and an inner heating chamber 8 which is in communication with the filter chamber 7 at its upper end. An oil inlet opening 9 at the lower end of the filter chamber 7 is threaded to receive an oil inlet line 10, and an oil outlet opening 11 at the lower end of the heating chamber is threaded to receive an oil outlet line 12 by which oil may be returned to the crankcase of an internal combustion engine.

A central upright heating unit 13 in the heating chamber 8 is circular in horizontal cross-section and has a dome shaped upper end 14 provided with a central upstanding small spur 15, the purpose of which is fully described hereafter. The heating unit 13 is open at its lower end and communicates with a hot gas inlet 16 which is attached to the exhaust manifold of the internal combustion engine through an intake pipe 17. An outlet pipe 18 extends substantially to the upper end of the heating unit 13 and passes through the open lower end of said unit where it is held in place by a close fitting knurled collar 19 which is engaged by a set screw 20. Hot gases from the exhaust manifold of the internal combustion engine enter the heating unit 13 through the intake pipe 17 and hot gas inlet 16, pass upwardly in contact with the cylindrical side wall of the heating unit and pass from the heating unit to the atmosphere through the outlet pipe 18, the flow of hot gases being indicated by arrows in Fig. 1.

A boss 21 at the oil inlet 9 cooperates with supporting fins 22 (only one of which is shown in the drawing) to support a perforated annular plate 23 upon which the filtering material rests in the filter chamber 7. Preferably the filtering material includes a bottom pad 24 of felt or other dense material, a substantial body 25 of looser filtering material such as cotton waste, mineral wool or the like and an upper felt pad 26 which is carried on top of the body 25 of loose filtering material. A second annular perforated plate 27 is seated upon the upper end of the cylindrical wall 6 and is centered thereon by means of an integral collar 28. Accidental dislodgement of the perforated plate 27 is prevented by means of vertical ribs 29 on the inside of the hollow body 5 which ribs are milled off to provide horizontally aligned slots 30; and recesses 31 in the periphery of the plate 27 may be registered with the vertical ribs 29 to insert or remove the plate, and the plate rotated a few degrees to move the recesses 31 out of register with the ribs so that the plate is locked in the slots 30. An oil delivery spout 32 projects inwardly and downwardly with respect to the upper surface of the annular plate 27 and has its inner end substantially directly above the central spur 15 on the heating unit 13.

A hollow oil distributing cap, indicated generally at 33, is provided with a plurality of perforations 34; and an external annular shoulder 34a is positioned immediately below the perforations 34. The oil distributing cap 33 has a cylindrical lower wall 35 and a dome shaped top at the apex of which is a small internal concavity 36 which seats upon the small upright spur 15 on the heating unit so that the oil distributing cap 33 is supported for universal movement above the heating unit 13 and has its lower portion surrounding and spaced from the upper end of said unit. Due to the dome shape of the upper end 14 of the heating unit, and the dome shape of the top of the oil distributing cap 33, the surface of said cap is generally concentric with the surface of the upper end of the heating unit except where the spur 15 engages the concavity 36, when the reclaimer is in a vertical position. The lower margin of the oil distributing cap 33 is provided with a plurality of outturned evenly spaced flanges 37, each of which is provided with an aperture so as to receive an oil carrying rod 38 which extends through said aperture and is provided with a head 39 by means of which it is pendulously supported upon the flange 37.

A closure member, indicated generally at 40, is shouldered at 41 so as to be supported upon the upper end of the hollow body member 5 and has an inner wall 42 and an outer wall 43 which are provided with registering central apertures 44 and 45 aligned with the top of the heating chamber 8. A plurality of projecting lugs 46 on the closure member 40 are apertured to receive bolts 47 which pass through apertured lugs 48 on the outside of the hollow body member 5 and are retained thereon by nuts 49 to lock the closure member 40 firmly in place.

In operation oil enters the filter chamber 7 through the oil inlet line 10 as indicated by the arrow, and passes upwardly through the perforated plate 23, the felt pad 24, the body of loose filtering material 25, the felt pad 26, the perforated plate 27 and flows along the oil delivery spout 32 onto the oil distributing cap 33. Part of the oil is trapped above the annular shoulder 34a and passes through the perforations 34 of the oil distributing cap onto the surface of the heating unit 13, while another part of the oil passes down the outer surface of the oil distributing cap 33 and along the oil carrying rods 38 upon which it spreads in a thin film so as to promote rapid and even vaporization of contaminants. After the oil has passed over the heating unit 13 or the oil carrying rods 38 it flows to the bottom of the heating chamber 8 and returns to the crankcase through the oil outlet 11 and the line 12.

From the above description of the oil circulation through the reclaimer, combined with the preceding description of the flow of heated exhaust gas through the heating unit 13, it is apparent that the light contaminants, including hydrocarbons and water, which cannot be removed from the oil by the filtering material are vaporized as they pass through the heating chamber 8 and the vaporized light contaminants pass out of the reclaimer through the registering apertures 44 and 45 in the closure member 40.

If the vehicle upon which the reclaimer is mounted is tilted slightly, the heating unit 13 will be canted slightly from the vertical; but the oil distributing cap 33, being mounted for universal movement, will tend to remain in such a position that oil carrying rods 38 are vertical. Thus, the tendency of the oil to gather on the low side of the heating unit 13 is substantially counterbalanced by the tendency of the oil to flow uniformly over the surface of the oil distributing cap 33 and down the vertical rods 38. Furthermore, the oil which passes through the apertures 34 will pass through in a generally uniform fashion so that at least initially it is evenly distributed over the heating unit 13 and does not become unevenly distributed until it has flowed partway down the wall of the unit. Thus, even as to this portion of the oil, heating and vaporization are more uniform than is the case without the oil distributing cap.

The foregoing detailed description is given for clearness of understanding only and no unnecessary limitations should be understood therefrom as modifications will be obvious to those skilled in the art.

I claim:

1. An oil reclaimer adapted to be mounted in a vehicle for use with the internal combustion engine thereof, comprising: a hollow body member; a filter chamber in said body member adapted to receive filtering means and having an oil inlet at its lower end and an oil outlet at its upper end; a heating chamber in communication with said filter chamber at its upper end and having an oil outlet at its lower end; a hollow, upright heating unit in said heating chamber; an oil distributing cap directly above and having its lower portion spaced from said heating unit, said cap being supported for free tilting movement in any direction about its apex, and being constructed and arranged to receive oil from above and deposit it in a generally uniform thin film upon the heating unit; and an oil delivery spout to deliver oil from said filter chamber onto said distributing cap.

2. The oil reclaimer of claim 1 wherein the oil distributing cap is hollow and its lower portion surrounds and is spaced from the heating unit.

3. The oil reclaimer of claim 1 wherein the oil distributing cap has a dome shaped top provided at its apex with a small internal concavity, and the heating unit has a solid top which is provided with a small central spur to engage said concavity.

4. The oil reclaimer of claim 1 wherein the oil distributing cap is provided with a plurality of evenly spaced downwardly extending oil carrying rods.

5. The oil reclaimer of claim 4 wherein the lower margin of the oil distributing cap is provided with out-turned flange means having evenly spaced apertures, and the rods extend through said apertures and have heads by which they are pendulously carried on the flange means.

6. An oil reclaimer adapted to be mounted in a vehicle for use with the internal combustion engine thereof, comprising: a body member; a filter chamber in said body member adapted to receive filtering means and having an oil inlet at its lower end and an oil outlet at its upper end; a heating chamber communicating with said filter chamber at its upper end and having an oil outlet at its lower end; a heating unit in said heating chamber, said heating unit being circular in horizontal cross-section and having a closed sidewall and having a dome shaped closed top provided with a small upright central spur; a hollow oil distributing cap having a perforated dome shaped top provided at its apex with a small internal concavity which engages said central spur whereby said cap is supported for free tilting movement in any direction about said spur, said cap having a sidewall which surrounds the upper end of the heating unit and is normally concentric therewith; a plurality of evenly spaced oil carrying rods depending from the oil distributing cap; and an oil delivery spout to deliver oil from the upper end of said filter chamber onto said distributing cap.

7. The oil reclaimer of claim 1 wherein the oil distributing cap is hollow and its upper part is provided with a plurality of perforations.

8. The oil reclaimer of claim 7 wherein an external annular shoulder is positioned immediately below the perforations in the cap.

WILLIAM C. SCHWALGE.

References Cited in the file of this patent

UNITED STATES PATENTS

| Number | Name | Date |
|---|---|---|
| 1,032,657 | Briggs | July 16, 1912 |
| 1,798,031 | Pipkin | Mar. 24, 1931 |
| 2,068,473 | Schwalge | Jan. 19, 1937 |
| 2,086,762 | Bradford | July 13, 1937 |
| 2,377,988 | Braun | June 12, 1945 |